United States Patent [19]

Ogura

[11] Patent Number: 5,784,518
[45] Date of Patent: Jul. 21, 1998

[54] APPARATUS FOR REPRODUCING CONTINUOUS FRAMES OR FIELDS OF A VIDEO SIGNAL

[75] Inventor: Eiji Ogura, Saitama, Japan

[73] Assignee: Sony Corporation, Tokyo, Japan

[21] Appl. No.: 323,885

[22] Filed: Oct. 17, 1994

[30] Foreign Application Priority Data

Oct. 18, 1993 [JP] Japan ................. 5-284034

[51] Int. Cl.$^6$ ................................ H04N 5/783
[52] U.S. Cl. ................................ 386/68; 386/111
[58] Field of Search ................. 358/335, 342, 358/312, 341; 360/33.1, 35.1, 32; 369/32, 48; 386/46, 68, 81, 111, 110, 125, 124, 82, 87; H04N 5/783

[56] References Cited

U.S. PATENT DOCUMENTS

| | | | |
|---|---|---|---|
| 4,361,849 | 11/1982 | Bolger | 358/342 |
| 4,837,637 | 6/1989 | Akiyama et al. | 358/342 |
| 4,931,879 | 6/1990 | Koga et al. | 358/342 |
| 5,006,939 | 4/1991 | Cawley | 358/341 |
| 5,155,593 | 10/1992 | Yonemitsu et al. | 348/413 |
| 5,159,488 | 10/1992 | Yamashita | 358/342 |
| 5,228,020 | 7/1993 | Shiragami et al. | 358/342 |
| 5,239,429 | 8/1993 | Hoshi | 360/72.1 |
| 5,502,570 | 3/1996 | Shikakura et al. | 358/342 |

FOREIGN PATENT DOCUMENTS

| | | |
|---|---|---|
| 0 177 231 | 4/1986 | European Pat. Off. |
| 0 199 425 | 10/1986 | European Pat. Off. |
| 0 236 944 | 9/1987 | European Pat. Off. |
| 0 357 430 | 3/1990 | European Pat. Off. |

OTHER PUBLICATIONS

Patent Abstracts of Japan, vol. 11 No. 320 (E-550), 17 Oct. 1987, JP-A-62 110376 (Matsushita) 21 May 1987, * abstract *.

*Primary Examiner*—Thai Tran
*Assistant Examiner*—Huy Nguyen
*Attorney, Agent, or Firm*—Frommer Lawrence & Haug LLP; William S. Frommer

[57] ABSTRACT

M/N-fold high-speed reproduction is achieved by displaying continued N frames at intervals of M frames. The order of the reproduced frames becomes 0, 1, 2, . . . , N−1, M, M+1, M+2, . . . , M+N−1, 2M, 2M+1, 2M+2, . . . , 2M+N−1, 3M, 3M+1, 3M+2, 3M+N−1, . . . . Thereby, good continuity of picture images between frames, when high-speed reproduction is performed in a video signal reproducing apparatus, can be provided.

7 Claims, 13 Drawing Sheets

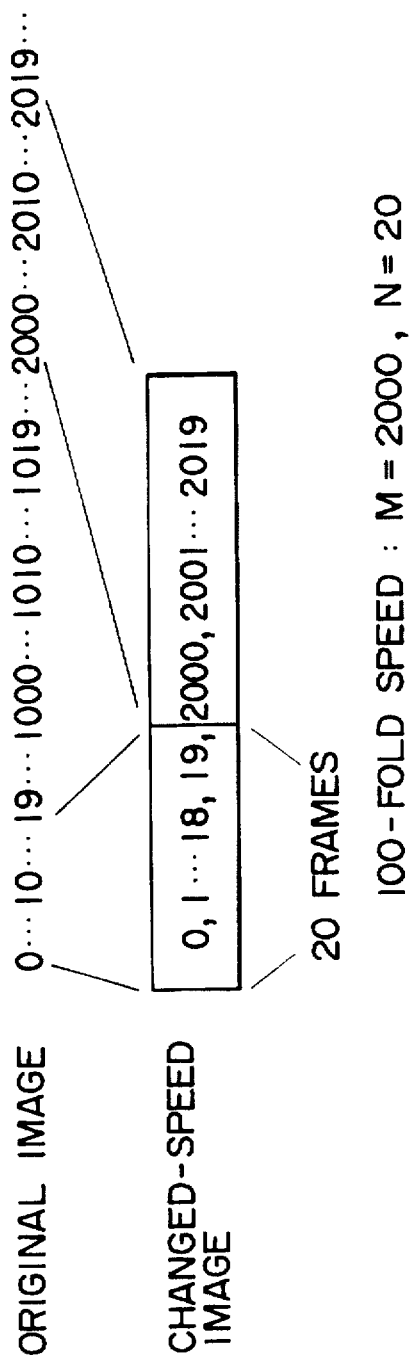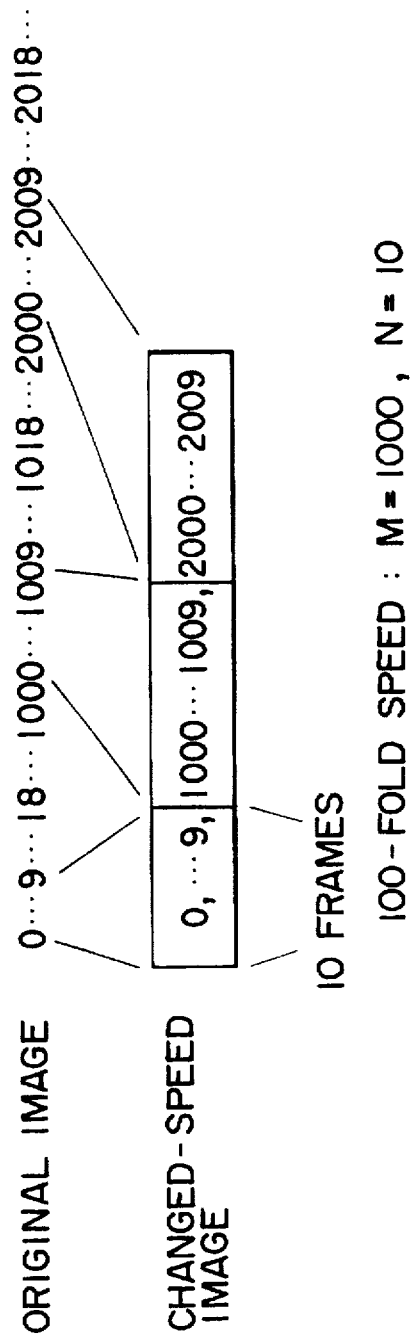
FIG. 12(a)
FIG. 12(b)

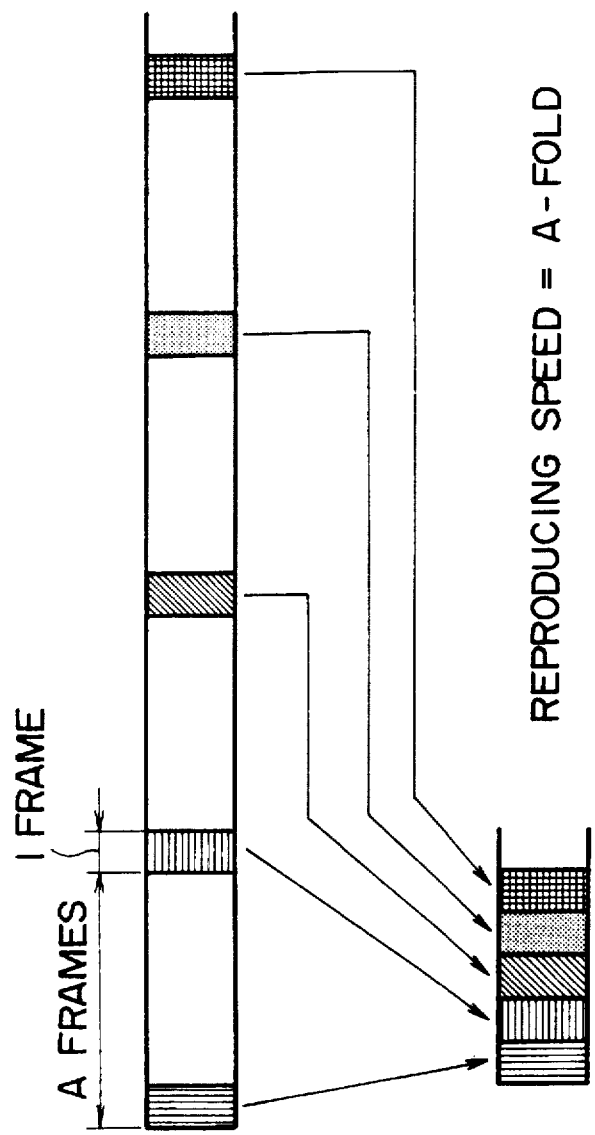

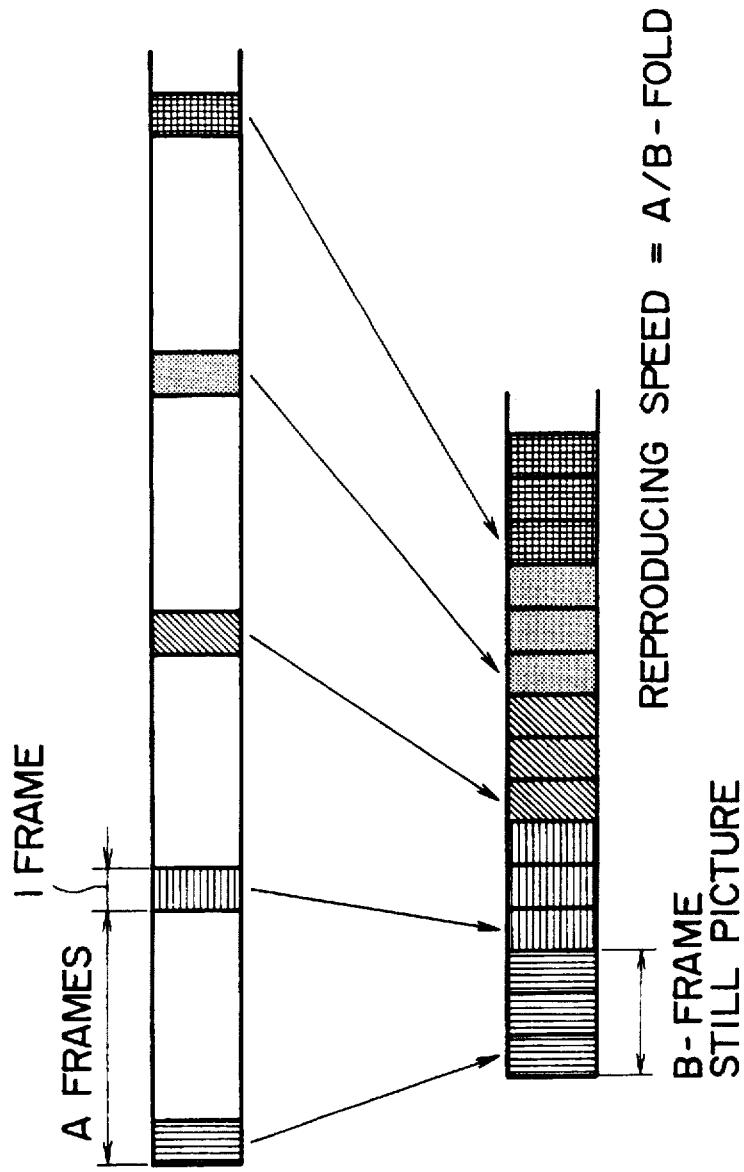

APPARATUS FOR REPRODUCING CONTINUOUS FRAMES OR FIELDS OF A VIDEO SIGNAL

BACKGROUND OF THE INVENTION

The invention relates to an apparatus reproducing a video signal at high speed from a storage medium such as a video disk, a hard disk, and a semiconductor memory permitting random access.

In a video disk system, for example a laser disk system, one frame of a video signal is recorded in each rotation of the disk in the case of CAV disks and one to three frames of video signal are recorded in each rotation of the disk in the case of CLV disks. As an example of the related arts, there is one disclosed by us in U.S. Pat. No. 5,159,488.

In performing A-fold (A is an integer 2 or above) high-speed reproduction in such a video disk system, it is practiced to successively display one frame at intervals of A frames as shown in FIGS. 14(a) and 14(b). More specifically, such operation is repeated that, after one frame has been read from a video disk, the read head is moved to the track located A frames rearward during, generally, a vertical blanking period, and a next video signal is read therefrom.

There has, however, been a problem with such a reproducing system that it becomes difficult to grasp the content of the picture image when the reproducing speed becomes very high. For example, when 100-fold speed reproduction (A=100 in FIGS. 14(a) and 14(b)) is performed, in succession of display of one frame, the other 100 frames rearward is displayed.

Therefore, continuity of picture images between the frames becomes little and it becomes difficult to grasp the content.

Further, when it is attempted to search a desired picture image by performing a high-speed search and thereafter set a still mode or normal reproduction mode to obtain a desired picture image, there has been a problem that the track where the desired picture image is recorded is passed by and, thus, an accurate search is difficult to achieve.

Further, when a video signal in the track located A frames rearward cannot be read within a vertical blanking period, for example in the case of a CLV disk of which the reproducing speed is high, it becomes necessary to repeat reading the video signal of the same frame from the frame memory for a B-frame period as shown in FIGS. 15(a) and 15(b) and display the same until the video signal in the track located A frames rearward is read. Then, continuity of picture images between the frames becomes worse and grasping the content becomes more difficult.

SUMMARY OF THE INVENTION

The invention has been made to solve the above mentioned problems. Accordingly, it is an object of the invention to provide a video signal reproducing apparatus capable of making continuity of picture images between frames good and reproducing picture images the content of which is easy to grasp. Another object of the invention is to provide a video signal reproducing apparatus making an accurate high-speed search possible.

In order to solve the above mentioned problems, the invention in its first aspect is structured, in a video signal reproducing apparatus comprising means for reading a video signal from a storage medium, and means for outputting the read video signal to display means, such that continued N frames or N fields at intervals of M frames or M fields (where M and N are integers satisfying M>N>1) of a video signal are output to the display means.

The invention in its second aspect is structured, in a video signal reproducing apparatus of the first aspect, such that, when high-speed reproduction in the reverse direction is performed therein, N frames or N fields of a video signal are read in the forward direction and the read video signal is output to the display means in the forward direction.

Further, the invention in its third aspect is structured, in a video signal reproducing apparatus comprising means for reading a video signal from a storage medium, and means for outputting the read video signal to display means, such that L frames or L fields as part of continued N frames or N fields at intervals of M frames or M fields (where L, M, and N are integers satisfying M>N>L>1) of a video signal are output to the display means.

According to the first aspect of the invention, since images of continued N frames or N fields at intervals of M frames or M fields (where M and N are integers satisfying M>N>1) are displayed, M/N-fold high-speed reproduction can be achieved. For example, when M=1000 and N=20 are set and forward reproduction is performed, images of frames or fields 0, 1, 2, . . . , 18, 19, 1000, 1001, 1002, . . . , 1018, 1019, 2000, 2001, 2002, . . . , 2018, 2019, 3000 . . . are displayed and, accordingly, 50-fold high-speed reproduction is achieved.

According to the second aspect of the invention, in the reverse reproduction, images of continued N frames or N fields at intervals of M frames or M fields are displayed in the forward direction. For example, when M=1000 and N=20, images of frames or fields 2000, 2001, 2002, . . . , 2018, 2019, 1000, 1001, 1002, . . . , 1018, 1019, 0, 1, 2, . . . . , 18, 19, . . . are displayed.

According to the third aspect of the invention, since images of L frames or L fields as part of continued N frames or N fields at intervals of M frames or M fields (where M, N, and L are integers satisfying M>N>L>1) are displayed, M/L-fold high-speed reproduction can be achieved. For example, M=1000, N=20, and L=10 are set and reproduction is performed in the forward direction, images of frames or fields 0, 2, 4, . . . , 16, 18, 1000, 1002, 1004, . . . , 1016, 1018, 2000, 2002, 2004, . . . , 2016, 2018, 3000 . . . are displayed and, hence, 100-fold high-speed reproduction can be achieved.

BRIEF DESCRIPTION OF THE DRAWINGS

The invention will be described with reference to the drawings, in which:

FIGS. 12(a) and 12(b) are diagrams showing the orders of reproduced frames when 20 frames at intervals of 1000 frames and 10 frames at intervals of 1000 frames are reproduced in the forward direction in high speed, respectively;

FIGS. 14(a) and 14(b) are diagrams showing the basic operation made in a conventional video disk system when A-fold high-speed reproduction is performed; and FIGS. 15(a) and 15(b) are diagrams showing a high-speed reproducing operation made in a conventional video disk system when the access period is longer.

DETAILED DESCRIPTION OF THE PREFERRED EMBODIMENT

An embodiment of the invention will be described in detail with reference to the accompanying drawings.

Figure 2:
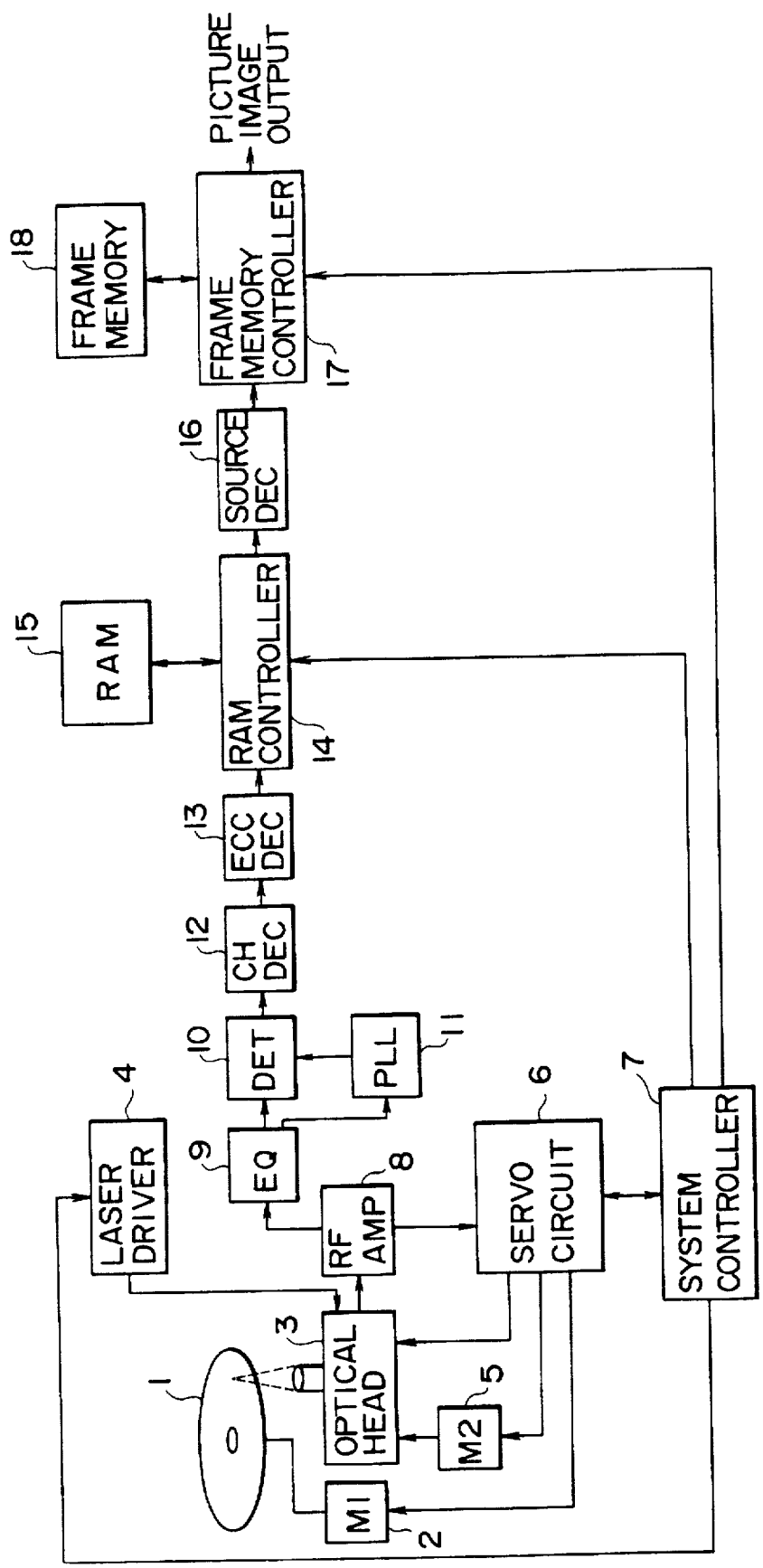
FIG. 2 is a block diagram of a structure of a video signal reproducing apparatus to which the invention is applied.

FIG. 2 is a block diagram showing a structure of a video signal reproducing apparatus to which the invention is applied. Referring to FIG. 2, video data obtained by A/D converting a video signal and compressing the same for data on the MPEG system or the like is recorded. As an example of the related arts, there is one disclosed by us in U.S. Pat. No. 5,155,593. A spindle motor 2 rotates the video disk 1 at a predetermined rotational speed. An optical head 3 throws a laser beam from a semiconductor laser incorporated therein on the video disk 1 and reads data recorded therein. The semiconductor laser in the optical head 3 is driven by a laser driver 4. The optical head 3 is structured to be slid in the radial direction of the video disk 1 by a slide motor 5.

A video signal reproduced from the optical head 3 is amplified by an RF amplifier 8 and supplied to a servo circuit 6 and an equalizer 9. The servo circuit 6 produces a tracking control signal, a focus control signal, and a spindle control signal from the output of the RF amplifier 8 and supplies the signals to the optical head 3 and the spindle motor 2. The servo circuit 6, further, supplies a control signal for controlling the slide motor 5 at the time of high-speed reproduction and random access.

The laser driver 4 and the servo circuit 6 are controlled by a system controller 7. The system controller 7 is formed of a microcomputer and executes control of the whole apparatus.

The equalizer 9 equalizes the output waveform of the RF amplifier 8 and supplies its output to a detector circuit 10 and a PLL circuit 11. The PLL circuit 11 extracts a clock signal on the basis of the output from the equalizer 9 and supplies the clock signal to the detector circuit 10. The detector circuit 10, on the basis of the clock signal, converts input data to binary data changing between two values of 0 and 1.

The output of the detector circuit 10 is supplied to a channel decoder 12 and, therein, demodulation of the modulated record is performed, and the output therefrom is supplied to an ECC decoder 13. The ECC decoder 13 performs error correction of the video data using an error correcting code added to the video data and outputs the corrected data to a RAM controller 14.

The RAM controller 14 temporarily stores the output of the ECC decoder 13 into a RAM 15 and reads the data from the same to thereby absorb the difference between the rate of data reading from the video disk 1 and the processing rate in a source decoder 16.

The source decoder 16 decodes the video data compressed for data on the MPEG system or the like and supplies the decoded data to a frame memory controller 17. The frame memory controller 17, according to the need, stores the video data into a frame memory 18 and reads the data to output image data. The image data output from the frame memory is A/D converted and output to a display unit (not shown) to be displayed as a picture image.

Operations made in the video signal reproducing apparatus structured as described above when it performs high-speed reproduction will be described below.

[1] Forward Reproduction

Figure 1:
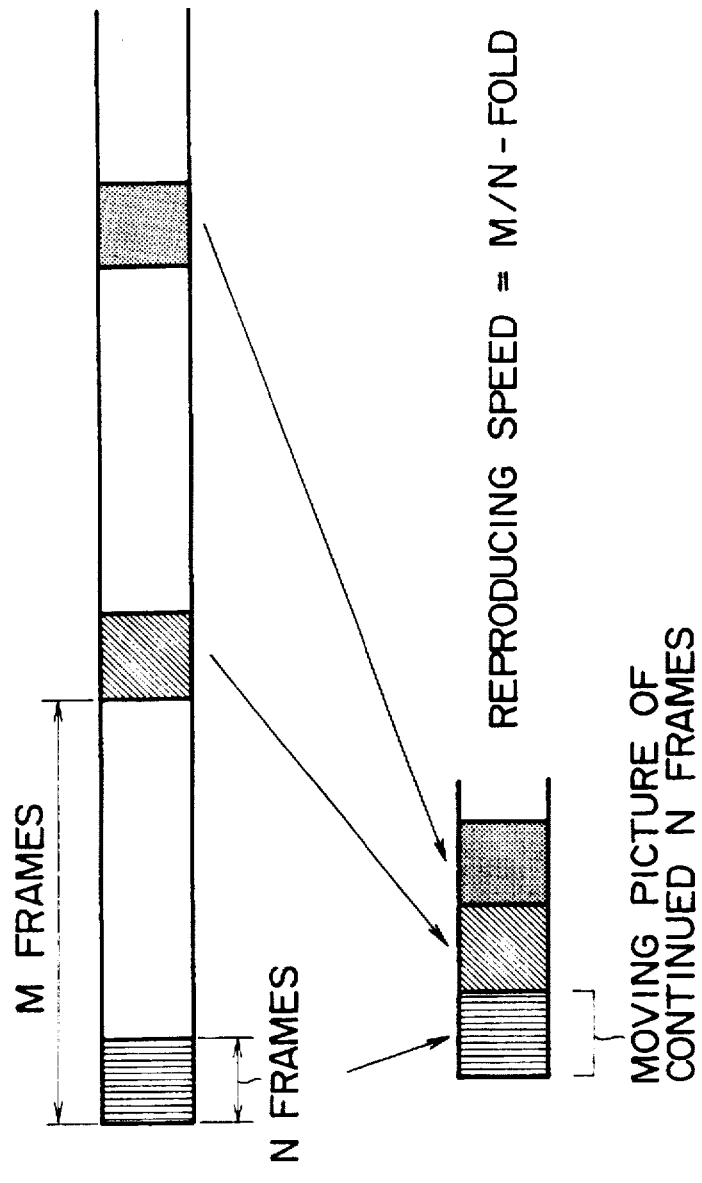
FIGS. 1(a) and 1(b) are drawings explanatory of basic operation of a system performing M/N-fold high-speed reproduction by reproducing continued N frames at intervals of M frames.

FIGS. 1(a) and 1(b) are diagrams showing the basic operation made in the forward reproduction. In the present invention, high-speed reproduction at M/N-fold speed is achieved by displaying continued N frames at intervals of M frames, where M and N are integers satisfying the relationship M>N>1. The values of M and N need not be fixed values but may be variable. The order of the reproduced frames are as follows:

0, 1, 2, . . . , N−1, , M, M+1, M+2, . . . , M+N−1, 2M, 2M+1, 2M+2, . . . , 2M+N−1, 3M, 3M+1, 3M+2, . . . , 3M+N−1, . . . .

Relationships among the operation to read data, the operation to access the track, and the operation to display data will be described below.

(a) In the Case Where Data Read Time=Data Display Time

Figure 3:
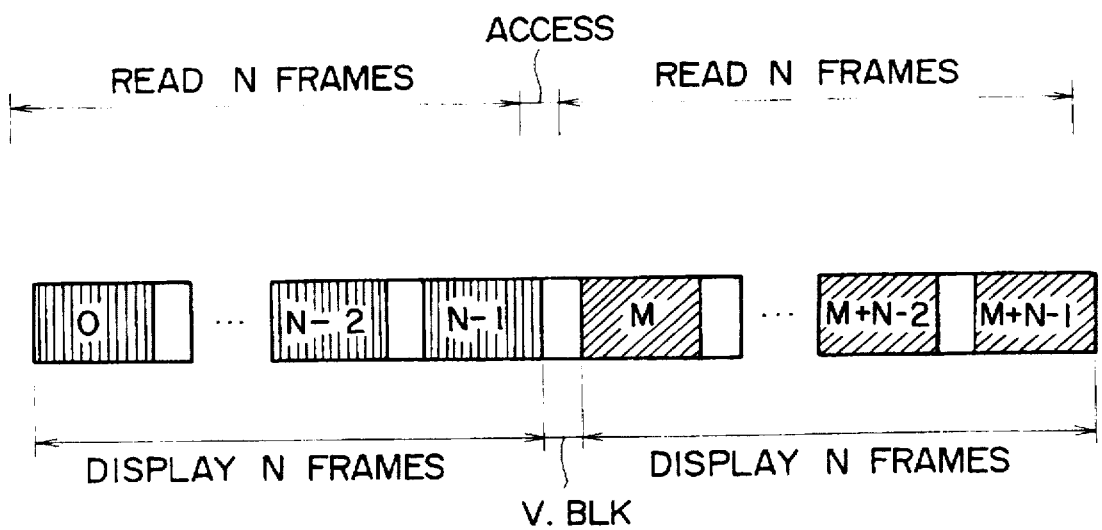
FIG. 3 is a diagram showing an example of an operational timing chart in forward reproduction when the time for reading data equals the time for displaying the data.

When the time for reading video data necessary for displaying N frames from the video disk 1 nearly equals the time for displaying the N frames, the reading and the displaying of the video data are performed at the timing shown in FIG. 3. Namely, N frames of video data are read from the video disk 1 and then the N frames of video data are displayed. When the reading of the N-frame video data has been finished, the optical head 3 is caused to move to the track where the data to be read next is present by drive of the slide motor 5 or movement of the optical head 3 itself so that it can read the video data. The access period must be within the vertical blanking period. Although the time for reading data is normally shorter than the time for displaying the data when compressed video data is recorded in the video disk 1 as with the system shown in FIG. 2, such a state is brought about when for example the number of revolutions of the video disk is decreased.

(b) In the Case Where Data Read Time<Data Display Time

Figure 4:
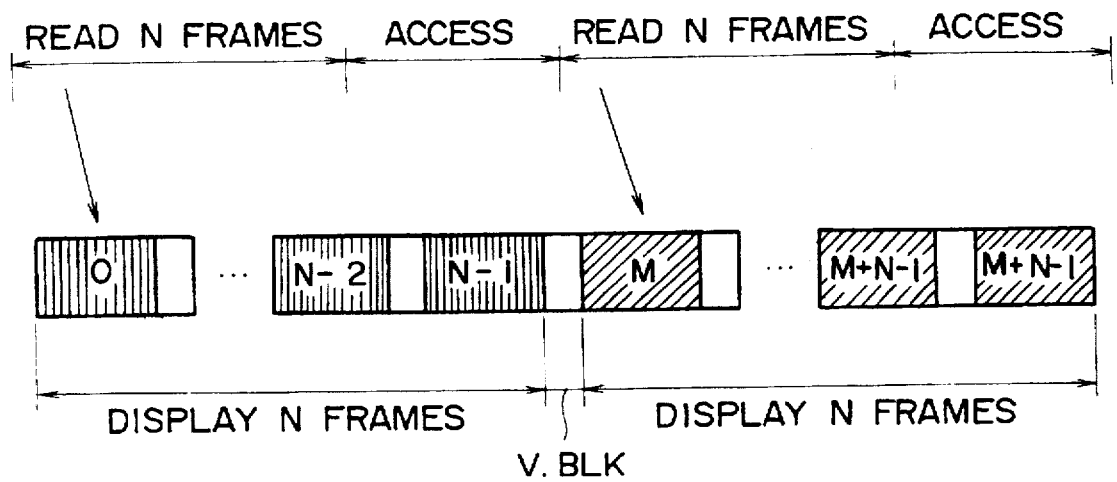
FIG. 4 is a diagram showing an example of an operational timing chart in forward reproduction when the time for reading data is shorter than the time for displaying the data.

When the time for reading video data necessary for displaying N frames from the video disk 1 is shorter than the time for displaying the N frames, the reading and the displaying of the video data are performed at the timing shown in FIG. 4. Such a state is brought about when for example the rate of reading data from the video disk 1 is larger than the rate of displaying the data. Since the system of FIG. 2 is structured so as to reproduce a video disk 1 in which video data compressed for data is recorded, the described state is generally brought about. Even when the system is such that is structured to reproduce a video disk with uncompressed video data recorded therein, the time for reading data becomes shorter than the time for displaying the data if the number of revolutions of the video disk is set higher.

In the case of FIG. 4, at the point of time where the video data necessary for displaying N frames have all been read, the access to the track to be read next is started. In this case the access period can be made longer than the vertical blanking period. As described earlier, there is a point of problem that, in the high-speed reproduction of a CLV disk, the access time becomes longer because a long time is required for locking the phase after the track jump. However, since the access period can be made longer in the present system, it becomes possible to cope with the high-speed reproduction of a CLV disk without using a frame memory.

Generally, relationships among the mean time Tr for reading one-frame data, the display time Td of one-frame data, and the access period d satisfy the following expression (1):

$$d \leq b - a = N \times (Td - Tr) \quad (1)$$

where

N: number of continued frames displayed a: read time of N-frame data b: display time of N-frame data.

From expression (1), it is known that the access period d can be prolonged by increasing the value of the number of continued frames N to be displayed.

Figure 5:
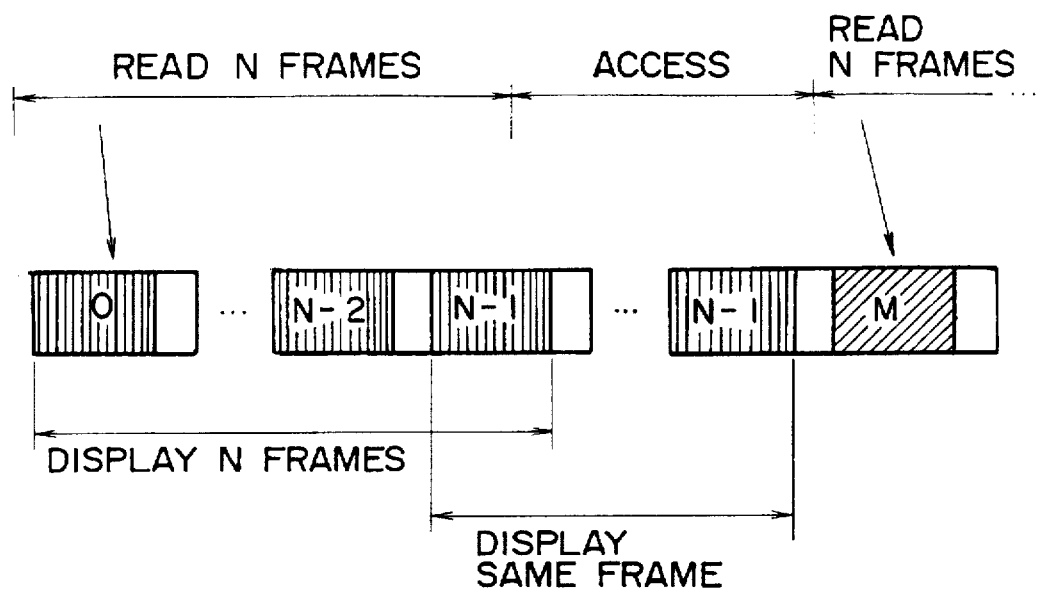
FIG. 5 is a diagram showing another example of an operational timing chart in forward reproduction when the time for reading data is shorter than the time for displaying the data.

When the access period d is long and, hence, expression (1) cannot be satisfied, the last frame (the frame to which a suffix N−1 is attached in FIG. 5) is continually displayed until next data is read. In such case, having the image of the last frame stored in the frame memory 18 of FIG. 2, the data may be repeatedly read and output to the display unit.

[2] Reverse Reproduction

Also in the reverse reproduction, continued N frames are displayed at intervals of M frames the same as in the forward reproduction. In the case of the reverse reproduction, two systems are possible: one in which the continued N frames are reproduced in the reverse direction and the other in which they are reproduced in the forward direction. The order of the displayed frames in each system is as follows:

In the system in which the continued N frames are displayed in the reverse direction: 3M+N−1, 3M+N−2, . . . , 3M+2, 3M+1, 3M, 2M+N−1, 2M+N−2, . . . , 2M+2, 2M+1, 2M, M+N−1, M+N−2, . . . , M+2, M+1, M, N−1, N−2, . . . , 2, 1, 0, . . . . In the system in which the continued N frames are displayed in the forward direction: 3M, 3M+1, 3M+2, . . . , 3M+N−1, 2M, 2M+1, 2M+2, . . . , 2M+N−1, M, M+1, M+2, . . . , M+N−1, 0, 1, 2, . . . , N−1, . . . .

The same as in the case of the forward reproduction, relationships among the operation to read data, the operation to access the track, and the operation to display data will be described below.

(a) In the Case Where Data Read Time=Data Display Time

Figure 6:
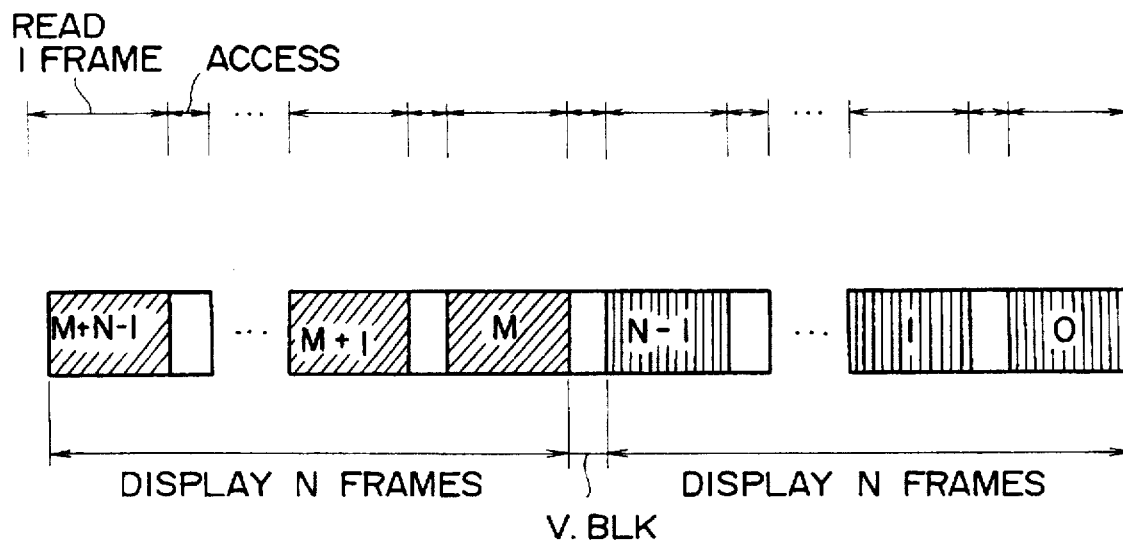
FIG. 6 is a diagram showing an example of an operational timing chart in backward reproduction when the time for reading data equals the time for displaying the data.

In this case, reading and displaying of video data are performed at the timing shown in FIG. 6. More specifically, data is read at intervals of one frame and, when reading of one frame is finished, the optical head 3 is caused to move to the track where the data to be read next is recorded so that it can read the data. This access period must be within the vertical blanking period. This is an example of the system in which the continued N frames are reproduced in the reverse direction. Such reading and displaying can be achieved only when the video data is not compressed or compressed within the frame. When motion compensated coding is performed as in the MPEG system, decoding in the reverse direction is impossible and, hence, such reproduction in the reverse direction of continued N frames cannot be achieved.

In the case where Data Read Time=Data Display Time, reproduction of continued N frames in the forward direction is also possible.

(b) In the Case Where Data Read Time<Data Display Time

Figure 7:
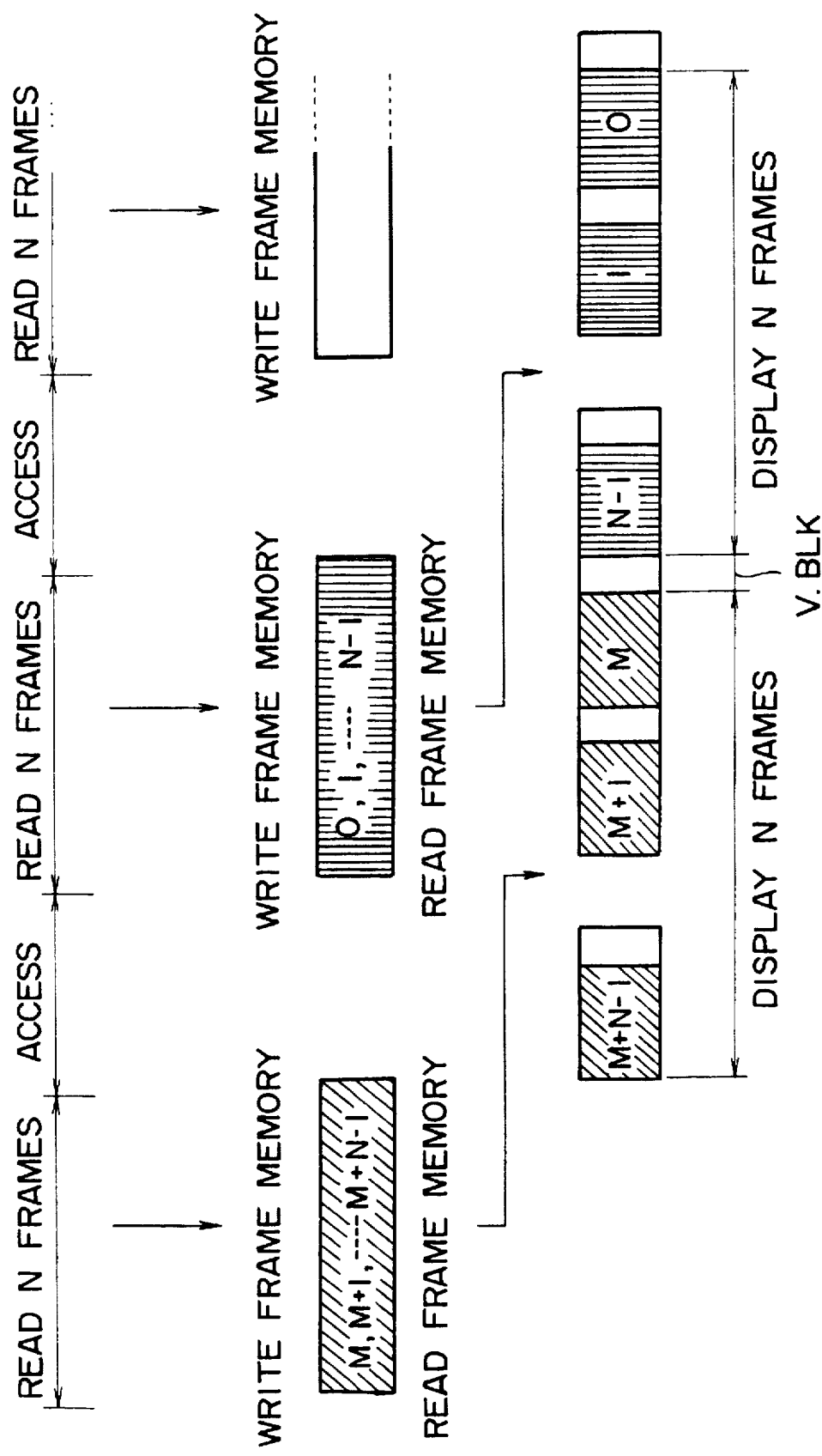
FIG. 7 is a diagram showing an example of an operational timing chart in backward reproduction when the time for reading data is shorter than the time for displaying the data.

FIG. 7 shows an example of the system in which continued N frames are reproduced in the reverse direction. In this example, the data necessary for displaying N frames are read from the video disk 1 in the forward direction and, when the reading of the N frames has been finished, the track where data to be read next is present is accessed. The data read are decoded by the source decoder 16 and written into the frame memory 18. When writing of N-frame data has been finished, the data are read in the order reverse to the order in which the data were written and output to the display unit.

In this case, though the frame memory 18 is required to have N-frame capacity, video data are input to the source decoder 16 in the forward direction. Therefore, even if the data compressing system is such as the MPEG system in which motion compensation is made, this method can be achieved. Although the time for reading necessary data for displaying N frames and the time for writing the data into the frame memory 18 is equal in the case of FIG. 7, this can be attained by increasing the speed of the write clock of the frame memory controller 17.

Figure 8:
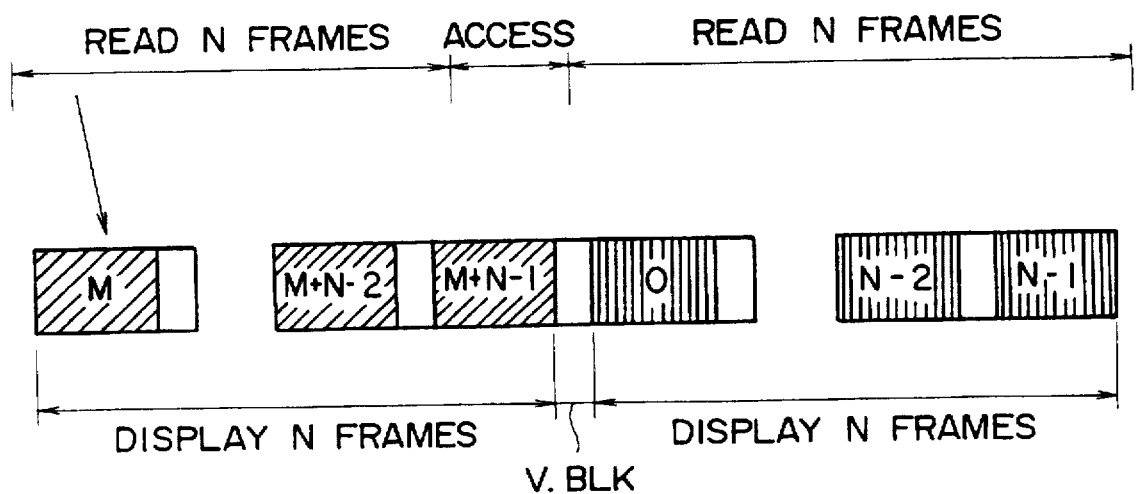
FIG. 8 is a diagram showing another example of an operational timing chart in backward reproduction when the time for reading data is shorter than the time for displaying the data.

FIG. 8 is an example of the system in which continued N frames are reproduced in the forward direction. In this example, N frames of data are read in the forward direction and, when the reading has been finished, the operation to access the track where the data to be read next is recorded is performed the same as in FIG. 7. In this case, however, the video data decoded by the source decoder 16 are not stored in the frame memory 18 for reversing the order but they are output to the display unit as they are.

In this case, the time interval between each of the N-frame data becomes larger as the value of M is increased. Therefore, a reproduced image not looking strange can be obtained even if the continued N frames are not reproduced in the reverse order. Further, it is possible to eliminate the frame memory 18.

Figure 9:
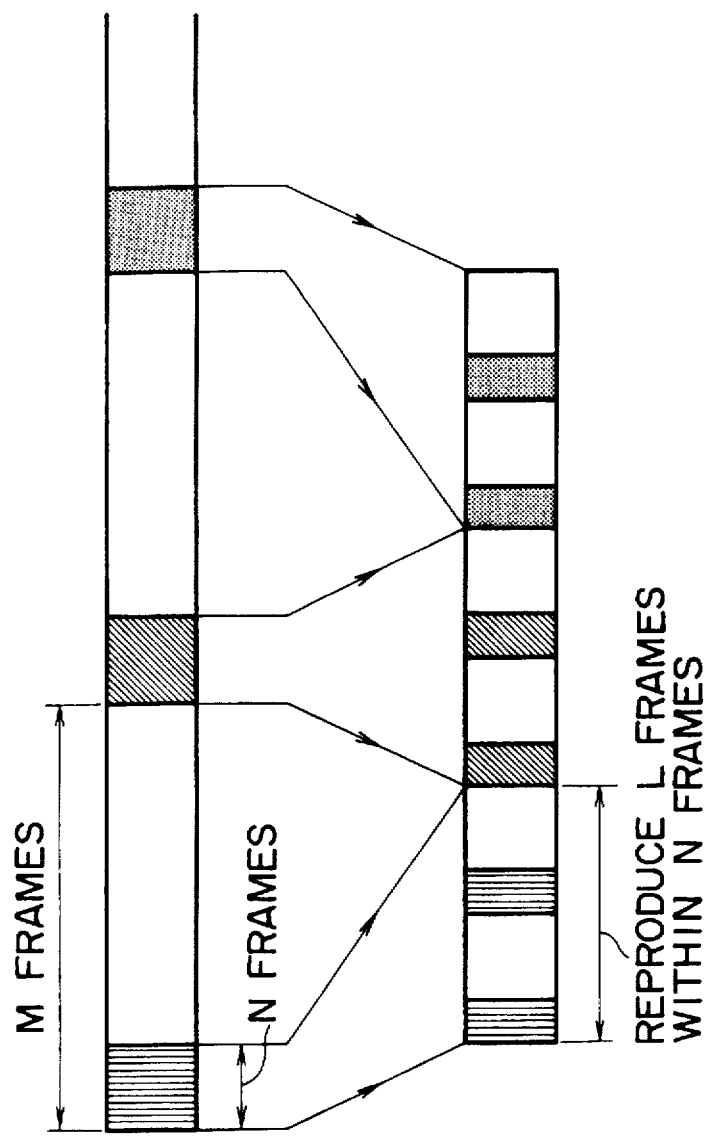
FIGS. 9(a) and 9(b) are drawings explanatory of basic operation of a system performing M/L-fold high-speed reproduction by reproducing L frames within continued N frames at intervals of M frames.

[3] System in which Part of Continued N Frames at Intervals of M Frames are Reproduced FIGS. 9(a) and 9(b) are diagrams explanatory of the basic operation in the system in which L frames within continued N frames at intervals of M frames are reproduced and, thereby, M/L-fold high-speed reproduction is achieved. In the above, M, N, and L are integers satisfying M>N>L>1. It is necessary that the L frames are split into at least two portions within the N frames as shown in FIG. 9(b). An example of the order of frames reproduced in the forward direction when L=N/3 becomes as follows:

0, 3, 6, . . . , N−1, M, M+3, M+6, . . . , M+N−1, 2M, 2M+3, 2M+6, . . . , 2M+N−1, 3M, 3M+3, 3M+6, . . . , 3M+N−1, . . . .

Figure 10:
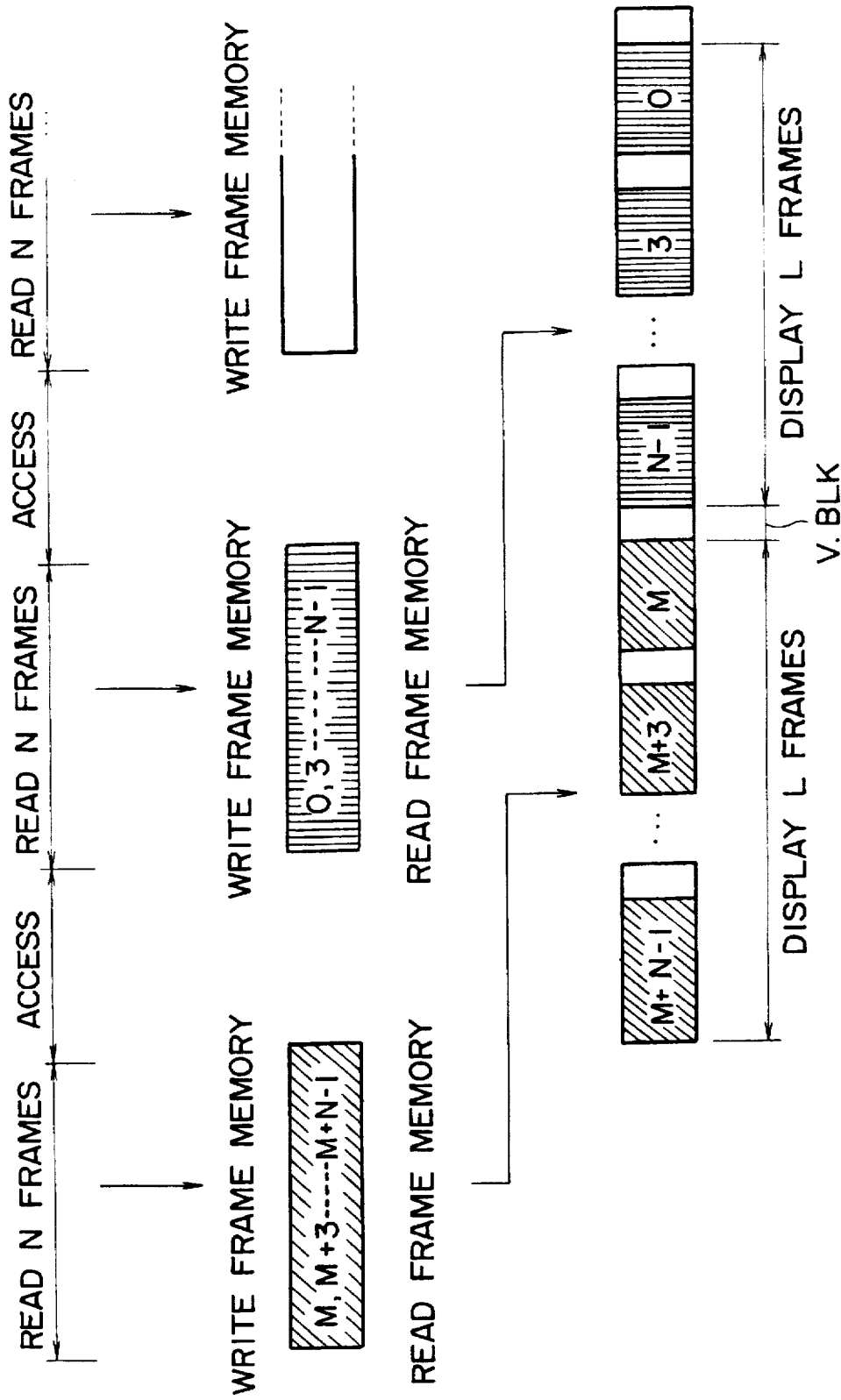
FIG. 10 is an operational timing chart when L frames are reproduced in the reverse direction in a system performing M/L-fold high-speed reverse reproduction by reproducing L frames within continued N frames at intervals of M frames.

Thus, in this reproducing system, when reading of data necessary for displaying a frame is finished, the track located N/L frames rearward where the data to be read next is recorded is accessed. Otherwise, N-frame data may be read in succession and only necessary portion thereof may be decoded and displayed. In the case of reverse reproduction, two systems are applicable as in the case described in [2](b), i.e., one system in which L frames are reproduced in the forward direction and the other system in which the L frames are reproduced in the reverse direction. Operation performed in the system in which reproduction is made in the reverse direction is shown in FIG. 10. In this case, only L-frame capacity is required as the capacity of the memory for reversing the order of frames read from the video disk, and therefore the memory can be made smaller than that used in the case of [2](b).

Now, the features of the reproducing system [3] will be described through comparison of the reproducing method [3] with the reproducing method [1].

Figure 11:
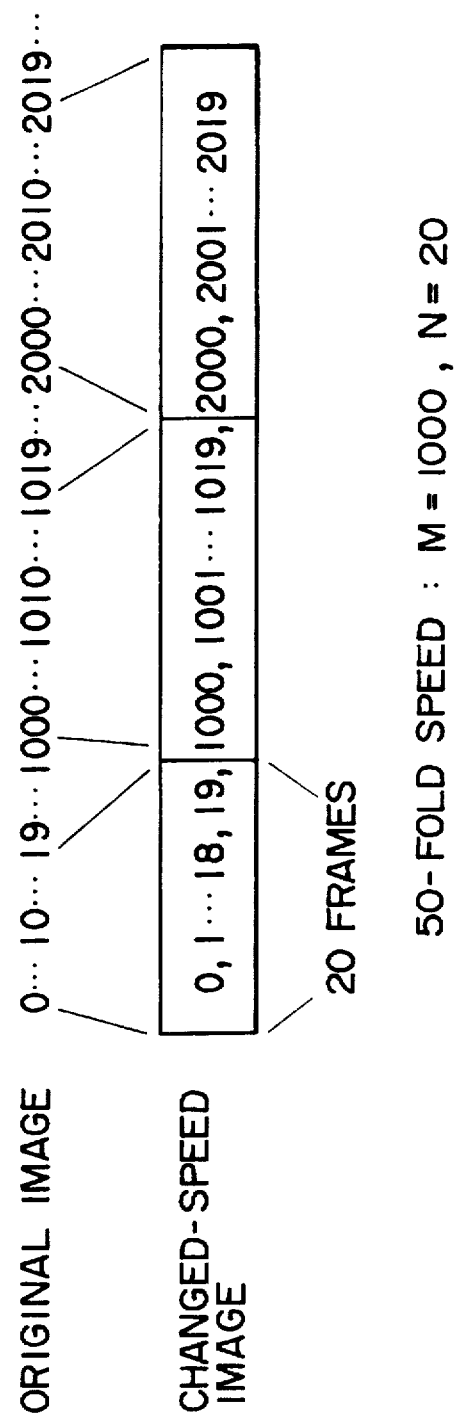
FIG. 11 is a diagram showing the order of reproduced frames when 20 frames at intervals of 1000 frames are reproduced in the forward direction in high speed.

Supposing that 50-fold high-speed reproduction is performed while M=1000 and N=20 are set in the reproducing system of [1], the order of the reproduced frames becomes as shown in FIG. 11.

When the speed is to be increased from the above described state to 100-fold speed, there are two methods, i.e., (1) one method in which M=2000 and N=20 are set, and (2) the other method in which M=1000 and N=10 are set. The orders of frames reproduced in the methods (1) and (2) become as shown in FIGS. 12(a) and 12(b), respectively.

By comparison of FIG. 11 with FIGS. 12(a) and 12(b), it is known that there is a problem in the method (1) that the time interval in which frames are not displayed (for example, frames 1000–1019) becomes longer. It is known that there also is a problem in the method (2) that the content that is continuously displayed becomes smaller. More specifically, while 0–19 frames were reproduced in the 50-fold speed reproduction, only 0–9 frames are displayed in the method (2).

Figure 13A:
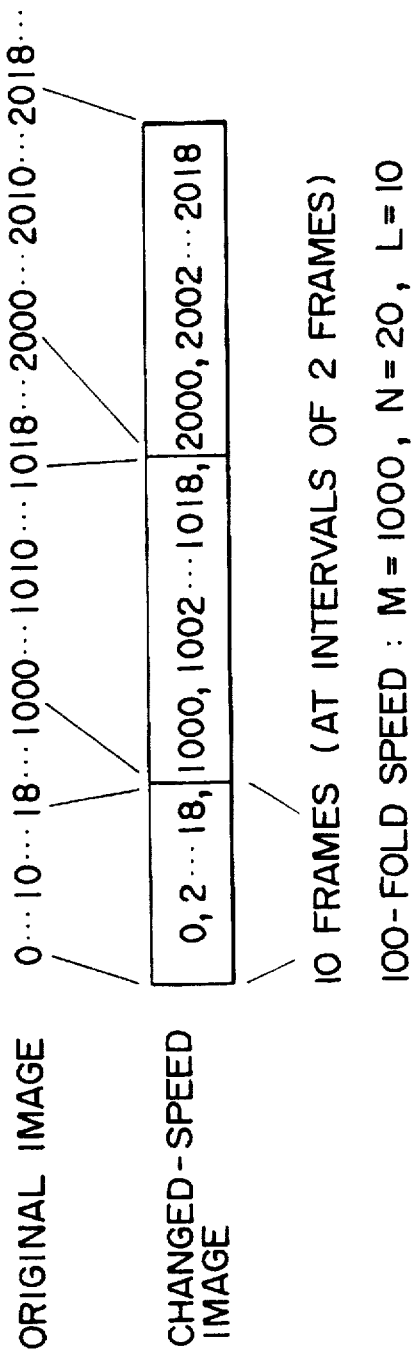
FIGS. 13(a) and 13(b) are diagrams showing the orders of reproduced frames when 10 frames within 20 frames at intervals of 1000 frames and 20 frames within 40 frames at intervals of 1000 frames are reproduced in the forward direction in high speed, respectively.

Against these, when M=1000, N=20, and L=10 are set in the reproducing system [3], the order of frames reproduced becomes as shown in FIG. 13(a). Thus, the problems in the methods (1) and (2) can be solved.

Figure 13B:
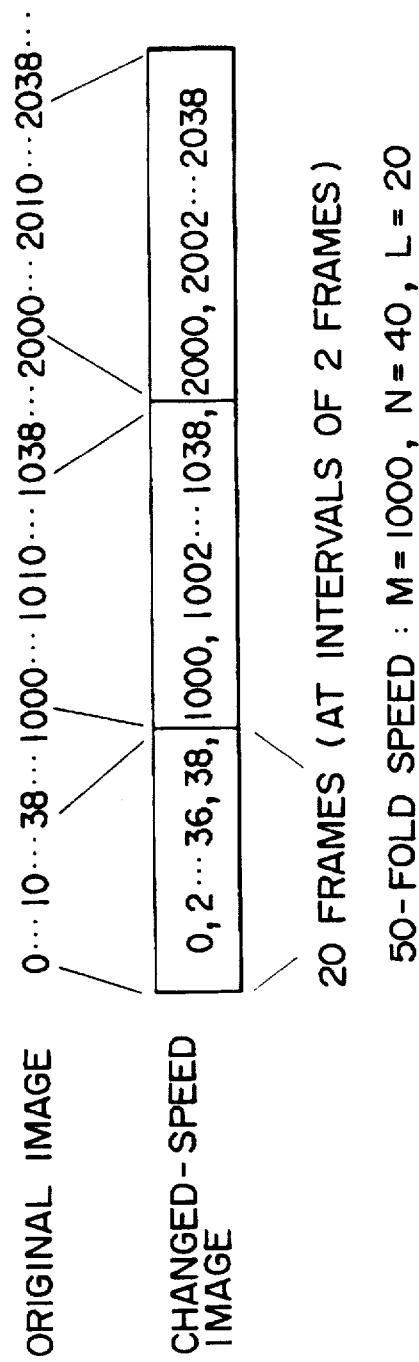

Further, if M=1000, N=40, and L=20 are set in the method [3], the order of frames reproduced becomes as shown in FIG. 13(b). Thus, two times as much content as that in the method [1] can be displayed although the reproducing speeds are the same 50-fold in these methods.

Although the above embodiment was described as a system reproducing a digital video disk in which video data compressed on the MPEG system or the like is recorded, the invention can be applied also to a system reproducing a video disk in which an analog video signal is recorded such as the conventional laser disk system. It can further be applied to the recording and reproducing system of the digital video disk, the system recording/reproducing a video signal on the hard disk, and the system writing/reading a video signal on a semiconductor memory.

Although, in the above embodiment, a video signal has been described to be read and displayed in units of frames, the system may be structured such that a video signal is read and displayed in units of fields.

According to the invention, as described above in detail, it has been made possible to reproduce picture images with good continuity of picture images between frames and easy to grasp the content thereof. Further, according to the invention, an accurate high-speed search has been made possible.

What is claimed is:

1. A video signal reproducing apparatus comprising:

read means for reading a video signal from a storage medium; and means operable in a first mode for outputting to display means N continuous frames of the read video signal at intervals of M frames and operable in a second mode for outputting to said display means N continuous fields of the read video signal at intervals of M fields, where M and N are integers satisfying M>N>2, and wherein the N continuous frames and the N continuous fields represent N different frames and N different fields of the read video signal, respectively.

2. A video signal reproducing apparatus according to claim 1, further comprising moving means for moving said read means in either forward or rearward directions; wherein the apparatus is operable in a high-speed reverse reproduction mode such that said moving means is operable in a first mode to displace said read means M frames in the rearward direction and said moving means is operable in a second mode to displace said read means M fields in the rearward direction, said read means after being displaced in the rearward direction is operable in a first mode to read N continuous frames of the video signal in the forward direction and said read means after being displaced in the rearward direction is operable in a second mode to read N continuous fields of the video signal in the forward direction, and said means for outputting outputs N continuous frames and N continuous fields of the read video signal in the forward direction to said display means in said first mode and said second mode, respectively.

3. A video signal reproducing apparatus comprising:

means for reading a video signal from a storage medium; and means operable in a first mode for outputting to display means L of N continuous frames of the read video signal at intervals of M frames and operable in a second mode for outputting to said display means L of N continuous fields of the read video signal at intervals of M fields where L, M, and N are integers satisfying M>N>L>1, and wherein the N continuous frames and the N continuous fields represent N different frames and N different fields of the read video signal, respectively.

4. A video signal reproducing apparatus comprising:

read means for reading a video signal from a disk-shaped storage medium;

drive means for sliding said read means in the radial direction of said disk-shaped storage medium;

a motor for rotating said disk-shaped storage medium;

a control circuit detecting the rotational state of said disk-shaped storage medium and the position of said read means relative to said disk-shaped storage medium for controlling the apparatus to be in a predetermined state;

a waveform shaping circuit for shaping the waveform of a reproduced video signal from said read means to generate a shaped video signal;

a frame memory for storing said shaped video signal;

means operable in a first mode for outputting to display means N continuous frames of said shaped video signal stored in said frame memory at intervals of M frames and operable in a second mode for outputting to said display means N continuous fields of said shaped video signal stored in said frame memory at intervals of M fields, where M and N are integers satisfying M>N>2, and wherein the N continuous frames and the N continuous fields represent N different frames and N different fields of said shaped video signal, respectively.

5. A video signal reproducing apparatus according to claim 4, further comprising moving means for moving said read means in either forward or rearward directions; wherein the apparatus is operable in a high-speed reverse reproduction mode such that said moving means is operable in a first mode to displace said read means M frames in the rearward direction and said moving means is operable in a second mode to displace said read means M fields in the rearward direction, and said read means after being displaced in the rearward direction is operable in a first mode to read N continuous frames of the video signal in the forward direction and said read means after being displaced in the rearward direction is operable in a second mode to read N continuous fields of the video signal in the forward direction, and said means for outputting outputs N continuous frames and N continuous fields of said shaped video signal in the forward direction to said display means in said first mode and said second mode, respectively.

6. A video signal reproducing apparatus according to claim 5, wherein said video signal is recorded in said disk-shaped storage medium on the MPEG system.

7. A video signal reproducing apparatus according to claim 6, wherein said disk type storage means is an optical disk.

* * * * *